Dec. 24, 1957  W. L ROY  2,817,271
GUIDE HEAD FOR USE IN MIXING COLOR COMPONENTS
IN THE PROJECTION OF COLORED LIGHT
Filed Aug. 9, 1954

INVENTOR.
Walter L. Roy.
BY
Attorney

United States Patent Office 2,817,271
Patented Dec. 24, 1957

2,817,271

GUIDE HEAD FOR USE IN MIXING COLOR COMPONENTS IN THE PROJECTION OF COLORED LIGHT

Walter L. Roy, Saugus, Mass.

Application August 9, 1954, Serial No. 448,440

1 Claim. (Cl. 88—112)

This invention relates to apparatus for use in the projection of colored light with selective control of its color components thus to enable them to be mixed or blended as desired.

The effectiveness of a display, merchandise, for example, is often dependent on the color of its lighting. It is also recognized that a change in the color of the light can serve to extend the useful life of a display. These are among the reasons why lights used in display illumination have removable heads, each providing for a predetermined color. Each such head imparts a predetermined color to the light passing through its aperture and it will be apparent that providing desired color effects by this expedient entails considerable expense.

The principal objective of the present invention is to provide means enabling the color of projected light to be efficiently and economically controlled. This general objective is accomplished by employing two pairs of parallel reels. The reels of each pair are disposed with the aperture for the light source between them and approximately at right angles to the reels of the other pair. Film, having a suitable range of colors, is supported by each pair of reels so that by moving the films in one direction or the other projected light of the desired color is provided.

In the accompanying drawings, there is shown an illustrative embodiment of the invention from which these and other of its objectives, novel features, and advantages will be readily apparent.

Figure 1:
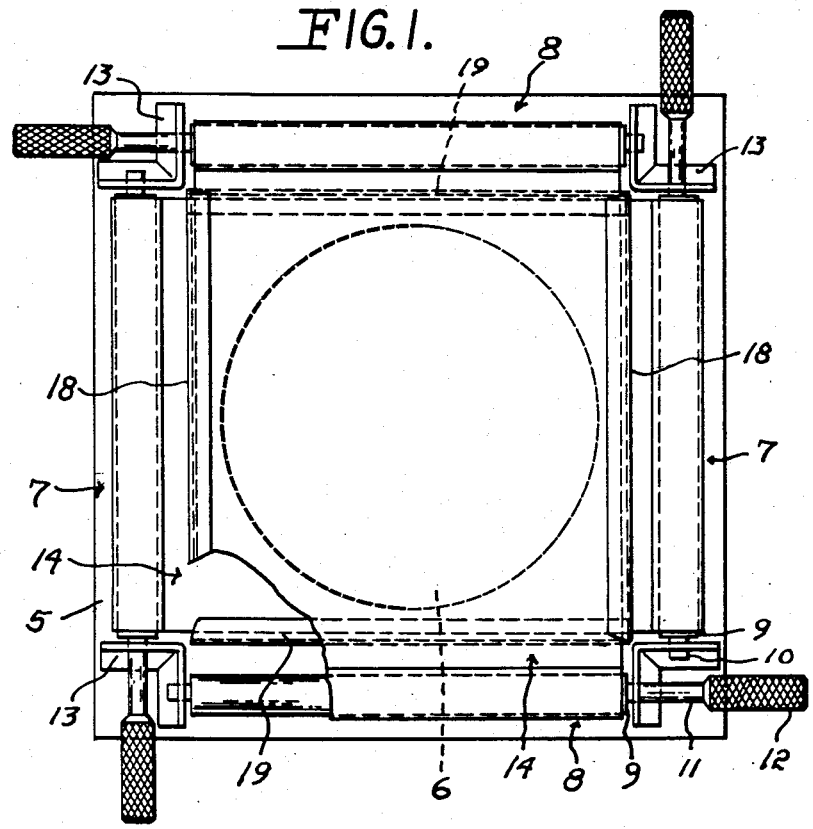
Fig. 1 is a front face view of a light source head in accordance with the invention.
Figure 2:
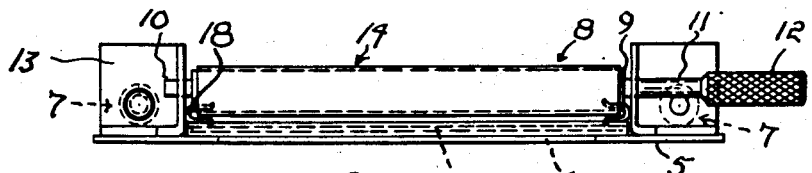
Fig. 2 is an edge view thereof.

As illustrative of the invention, a light source head is shown as having a plate 5 provided with a ilght aperture 6 located between the parallel pairs of generally indicated reels 7 and 8 disposed approximately at right angles to each other. The means by which the plate 5 is attached to its light source are not shown as such depend in part on the type of light source and in part on choice.

Each of the reels 7 and 8 is shown as consisting of a roller 9 having spindles 10 and 11, the spindle 11 including a digitally engageable knob 12. The spindles 10 and 11 are shown as rotatably supported in the corresponding walls of L-shaped mounts 13 shown as secured to the plate 5 in such a manner as to effect the appropriate disposition of the reels 7 and 8.

Figure 3:
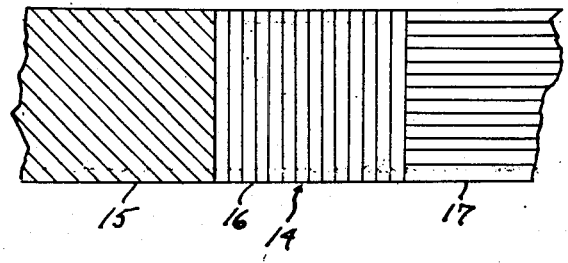
Fig. 3 is a schematic view illustrating a strip of film having sections of different colors.

Each pair of reels supports a transparent film, generally indicated at 14, and provided with a suitable range of colors. While these colors may merge gradually into one another, the film is shown, for convenience, in Fig. 3 as having definite sections such, for example, as the red section 15, and the green section 16, and the blue section 17. It will be understood that the area of any particular color must be sufficiently great to overlie the aperture 6.

In practice, either one or both of the films 14 are moved in one direction or the other relative to the aperture 6 until the color of the projected light meets existing requirements. For some purposes, the mixture of a relatively narrow range of colors meets projection requirements while for other purposes, the films must enable a full range of colors, and shades and intensities thereof, to be projected.

As illustrative of means for preventing contact of the films with each other, there are shown two pairs of parallel channels 18 and 19. Each channel of each pair is located between a reel and the aperture 6. The channels 18 are parallel with the reels 7 and at right angles to the reels 8 whose film 14 they marginally guide. The channels 19 marginally guide the film 14 of the reels 7 with reference to which they are disposed at right angles.

From the foregoing, it will be apparent that the invention makes possible accurate adjustment of the films relative to each other and the light source enabling the color components of the projected light to be quickly, easily, and accurately blended or mixed.

What I therefore claim and desire to secure by Letters Patent is:

A guide head for use in mixing color components in the projection of colored light, said head including a plate having a light aperture, and two pairs of parallel reels, the reels of each pair being rotatably carried by said plate with the aperture between them and disposed approximately at right angles to the reels of the other pair, a pair of strips of film having sections of different color, each section being dimensioned to cover said aperture, each of said strips of film being supported by a respective one of said pairs of reels to be fed back and forth with respect to said aperture, and guide means for each film strip, each guide means including a pair of channels disposed to receive the margins of a respective one of said film strips, one pair of channels being mounted on said plate and the other pair of channels being disposed at right angles to the first pair and attached to the extremities thereof.

References Cited in the file of this patent

UNITED STATES PATENTS

| | | |
|---|---|---|
| 599,670 | Harrison | Feb. 22, 1898 |
| 1,198,600 | Sudmann | Sept. 19, 1916 |
| 2,444,512 | Kath | July 6, 1948 |